United States Patent
Zhang et al.

(10) Patent No.: US 10,291,150 B1
(45) Date of Patent: May 14, 2019

(54) METHOD AND SYSTEM FOR OPERATING A PHASE-LEG OF A THREE-LEVEL ACTIVE NEUTRAL POINT CLAMPED CONVERTER

(71) Applicant: GENERAL ELECTRIC COMPANY, Schenectady, NY (US)

(72) Inventors: Di Zhang, Niskayuna, NY (US); Jiangbiao He, Niskayuna, NY (US); Sachin Madhusoodhanan, San Jose, CA (US); Di Pan, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 24 days.

(21) Appl. No.: 15/806,352

(22) Filed: Nov. 8, 2017

(51) Int. Cl.
  *H02M 7/5395* (2006.01)
  *H02M 7/487* (2007.01)

(52) U.S. Cl.
  CPC .......... *H02M 7/5395* (2013.01); *H02M 7/487* (2013.01)

(58) Field of Classification Search
  CPC ............................ H02M 7/487; H02M 7/5395
  See application file for complete search history.

(56) References Cited

U.S. PATENT DOCUMENTS

| | | |
|---|---|---|
| 8,144,490 B2 | 3/2012 | El-Barbari et al. |
| 8,228,695 B2 | 7/2012 | Roesner et al. |
| 8,929,114 B2 | 1/2015 | Li et al. |
| 9,344,005 B2 | 5/2016 | Ho et al. |
| 9,525,348 B1 | 12/2016 | Aeloiza et al. |
| 9,543,855 B2 | 1/2017 | Soeiro et al. |

FOREIGN PATENT DOCUMENTS

| | | |
|---|---|---|
| EP | 1325550 B1 | 3/2010 |
| EP | 2871765 A1 | 5/2015 |
| WO | 2016079039 A1 | 5/2016 |

OTHER PUBLICATIONS

J. Li, A. Q. Huang, S. Bhattacharya and G. Tan, "Three-Level Active Neutral-Point-Clamped (ANPC) Converter with Fault Tolerant Ability," 2009 Twenty-Fourth Annual IEEE Applied Power Electronics Conference and Exposition, Washington, DC, 2009, pp. 840-845.*

(Continued)

*Primary Examiner* — Jue Zhang
*Assistant Examiner* — Jye-June Lee
(74) *Attorney, Agent, or Firm* — GE Global Patent Operation; Seema Katragadda

(57) ABSTRACT

A method for operating a phase-leg of a three-level active neutral point clamped (3L-ANPC) converter is presented. The phase-leg includes an output terminal, a plurality of input terminals, and a plurality of switches disposed therebetween. The method includes operating the phase-leg in a neutral state to generate an output voltage having a neutral level. The method further includes transitioning the phase-leg to a first intermediate neutral state from the neutral state. Moreover, the method includes transitioning the phase-leg from the first intermediate neutral state to a first state to generate the output voltage having a first level. A modulator for operating the phase-leg of the 3L-ANPC converter is also presented. Moreover, a 3L-ANPC converter including the modulator is presented.

20 Claims, 8 Drawing Sheets

(56) References Cited

OTHER PUBLICATIONS

Gurpinar et al., "Performance analysis of SiC MOSFET based 3-level ANPC grid-connected inverter with novel modulation scheme", 2014 IEEE 15th Workshop on Control and Modeling for Power Electronics (COMPEL), pp. 1-7, 2014.

Jiao Yang, "High Power High Frequency 3-level NPC Power Conversion System", virginia tech, Sep. 25, 2015.

Jiao et al., "New Modulation Scheme for Three-Level Active Neutral-Point-Clamped Converter With Loss and Stress Reduction", IEEE Transactions on Industrial Electronics, vol. 62, Issue: 9, pp. 5468-5479, Sep. 2015.

* cited by examiner

METHOD AND SYSTEM FOR OPERATING A PHASE-LEG OF A THREE-LEVEL ACTIVE NEUTRAL POINT CLAMPED CONVERTER

STATEMENT REGARDING FEDERALLY SPONSORED RESEARCH AND DEVELOPMENT

This invention was made with Government support under contract number NNC15CA29C awarded by the National Aeronautics and Space Administration (NASA). The Government has certain rights in the invention.

BACKGROUND

Embodiments of the present specification relate generally to a three-level active neutral point clamped converter, and more specifically to a modulator and a method for operating a phase-leg of the three-level active neutral point clamped converter.

Typically, three-level active neutral point clamped (3L-ANPC) converters are employed to convert a direct current (DC) power to an alternating current (AC) power having a three-level output. The 3L-ANPC converters are widely used in AC drives and flexible AC transmission systems. These 3L-ANPC converters employ a plurality of switches to aid in the power conversion. Also, traditionally, 3L-ANPC converters that employ silicon carbide (SiC) switches such as SiC metal-oxide-semiconductor field-effect transistors (MOSFET) are used when it is desirable to withstand a high voltage and/or high power.

As will be appreciated, SiC MOSFETs switch faster in comparison to other switches such as insulated gate bipolar transistors (IGBTs), thereby resulting in lower switching losses. However, the faster switching of the SiC MOSFETs also leads to higher voltage stress across the SiC MOSFETs of the traditional 3L-ANPC converters due to a commutation loop inductance. Typically, in the traditional 3L-ANPC converters that employ SiC MOSFETs, large commutation loops or both the large commutation loops and small commutation loops are formed. Formation of the large commutation loops results in an increased loop inductance in the traditional 3L-ANPC converters. This increase in the loop inductance results in an increase in the voltage stress across the SiC MOSFETs, thereby resulting in a reduced lifetime of the SiC MOSFETs in the traditional 3L-ANPC converters.

Moreover, the SiC MOSFETs typically leverage a MOSFET body diode as an anti-parallel diode to reduce cost and space. Further, in the traditional 3L-ANPC converters, the MOSFET body diodes in some SiC MOSFETs are operated to conduct current for extended periods of time. However, such body diodes cannot conduct high current for extended periods of time due to thermal and reliability constraints, thereby leading to poor reliability of the traditional 3L-ANPC converters.

BRIEF DESCRIPTION

In accordance with certain aspects of the present specification, a method for operating a phase-leg of a three-level active neutral point clamped (3L-ANPC) converter is presented. The phase-leg includes an output terminal, a plurality of input terminals, and a plurality of switches disposed therebetween. The method includes operating the phase-leg in a neutral state to generate an output voltage having a neutral level by operating a second switch, a third switch, a fifth switch, and a sixth switch of the plurality of switches in a conducting state and operating a first switch and a fourth switch of the plurality of switches in a non-conducting state. The method further includes transitioning the phase-leg to a first intermediate neutral state from the neutral state by operating the second switch and the fifth switch in the conducting state and operating the first switch, the third switch, the fourth switch, and the sixth switch in the non-conducting state. Moreover, the method includes transitioning the phase-leg from the first intermediate neutral state to a first state to generate the output voltage having a first level by operating the first switch, the third switch, and the fifth switch in the conducting state and operating the second switch, the fourth switch, and the sixth switch in the non-conducting state.

In accordance with another aspect of the present specification, a modulator for operating a phase-leg of a 3L-ANPC converter is presented. The phase-leg includes an output terminal, a plurality of input terminals, and a plurality of switches disposed therebetween. The modulator includes a controller operatively coupled to the plurality of switches. The controller is and configured to operate the phase-leg in a neutral state to generate an output voltage having a neutral level by operating a second switch, a third switch, a fifth switch, and a sixth switch of the plurality of switches in a conducting state and operating a first switch and a fourth switch of the plurality of switches in a non-conducting state. The controller is further configured to transition the phase-leg to a first intermediate neutral state from the neutral state by operating the second switch and the fifth switch in the conducting state and operating the first switch, the third switch, the fourth switch, and the sixth switch in the non-conducting state. Furthermore, the controller is configured to transition the phase-leg from the first intermediate neutral state to a first state to generate the output voltage having a first level by operating the first switch, the third switch, and the fifth switch in the conducting state and operating the second switch, the fourth switch, and the sixth switch in the non-conducting state.

In accordance with another aspect of the present specification, a 3L-ANPC converter is presented. The 3L-ANPC converter includes one or more phase-legs. At least one phase-leg of the one or more phase-legs includes an output terminal, and a plurality of input terminals such as a first input terminal, a second input terminal, and a neutral input terminal. Furthermore, the phase-leg includes plurality of switches disposed between the plurality of input terminals and the output terminal. The plurality of switches includes a first switch, a second switch, a third switch, a fourth switch, a fifth switch, and a sixth switch, where the first switch, the second switch, the third switch, and the fourth switch of the plurality of switches are operatively coupled in series, and where the first switch is operatively coupled to the first input terminal, the fourth switch is operatively coupled to the second input terminal, an interconnection point of the second switch and the third switch is operatively coupled to the neutral input terminal, the fifth switch is operatively coupled between an interconnection point of the first switch and the second switch and the output terminal, and the sixth switch is operatively coupled between an interconnection point of the third switch and the fourth switch and the output terminal. The 3L-ANPC converter further includes a modulator operatively coupled to the plurality of switches of the one or more phase-legs. The modulator is configured to operate the phase-leg in a neutral state to generate an output voltage having a neutral level by operating the second switch, the third switch, the fifth switch, and the sixth switch of the plurality of switches in a conducting state and operating the first switch and the fourth switch of the plurality of switches in a non-conducting state. The modulator is further configured to transition the phase-leg to a first intermediate neutral state from the neutral state by operating the second switch and the fifth switch in the conducting state and operating the first switch, the third switch, the fourth switch, and the sixth switch in the non-conducting state. Moreover, the modulator is configured to transition the phase-leg from the first intermediate neutral state to a first state to generate the output voltage having a first level by operating the first switch, the third switch, and the fifth switch in the conducting state and operating the second switch, the fourth switch, and the sixth switch in the non-conducting state.

DRAWINGS

These and other features and aspects of embodiments of the present specification will become better understood when the following detailed description is read with references to the accompanying drawings in which like characters represent like parts throughout the drawings, wherein.

Figure 2:
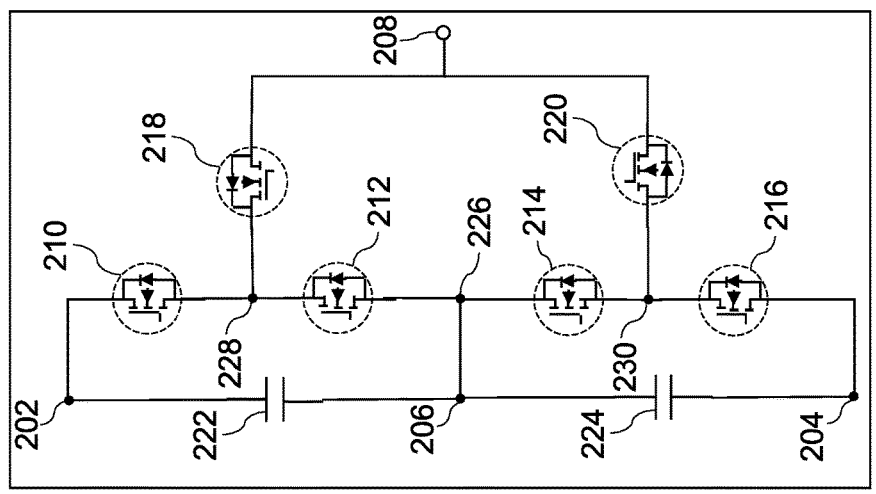
FIG. 2 is a schematic diagram of a phase-leg of the 3L-ANPC converter of FIG. 1, in accordance with aspects of the present specification.
Figure 3:
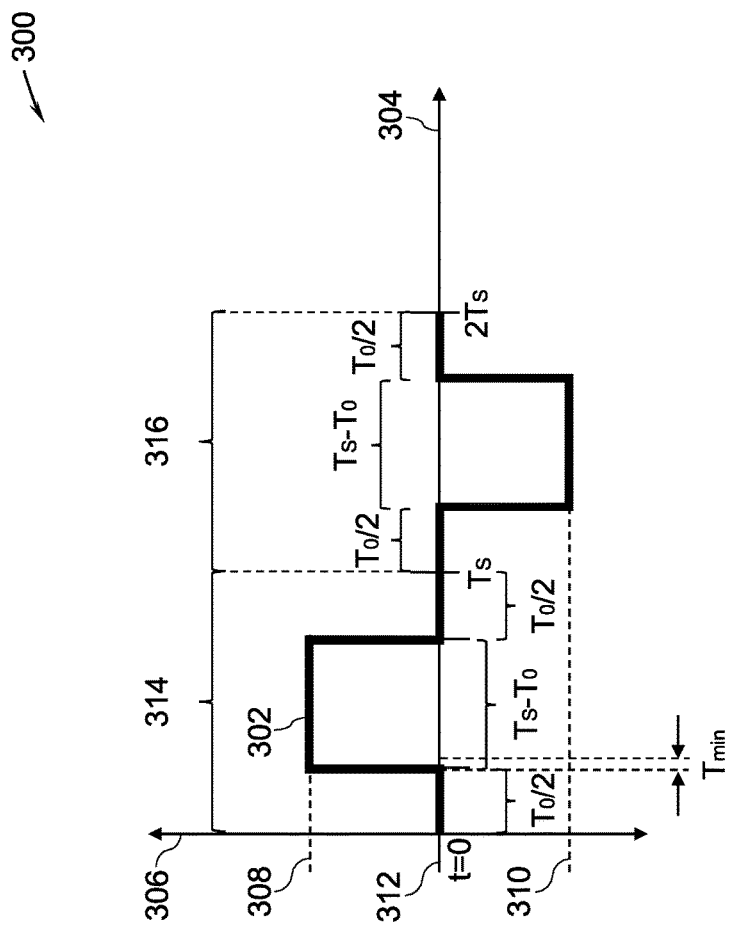
FIG. 3 is a graphical representation of an example signal representing an output voltage of the phase-leg of FIG. 2, in accordance with aspects of the present specification.
Figure 6:
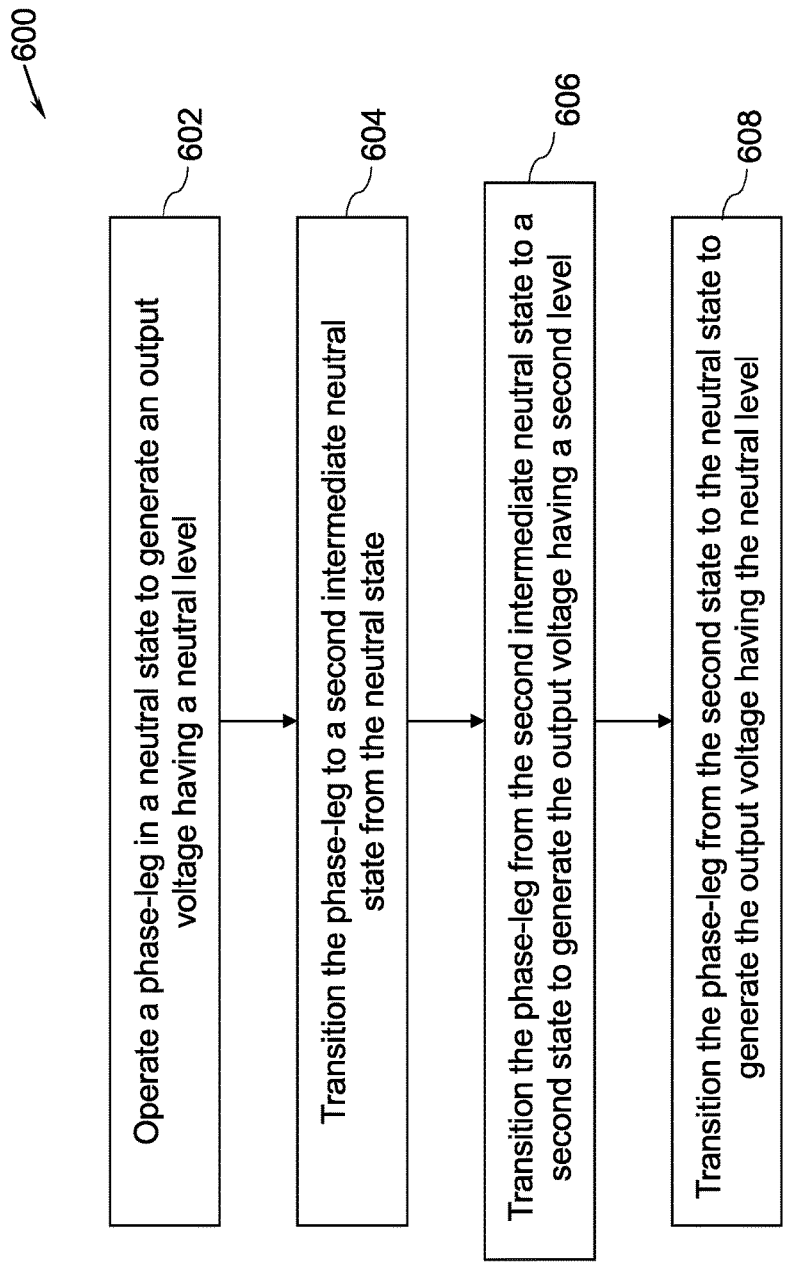
Figure 7A:
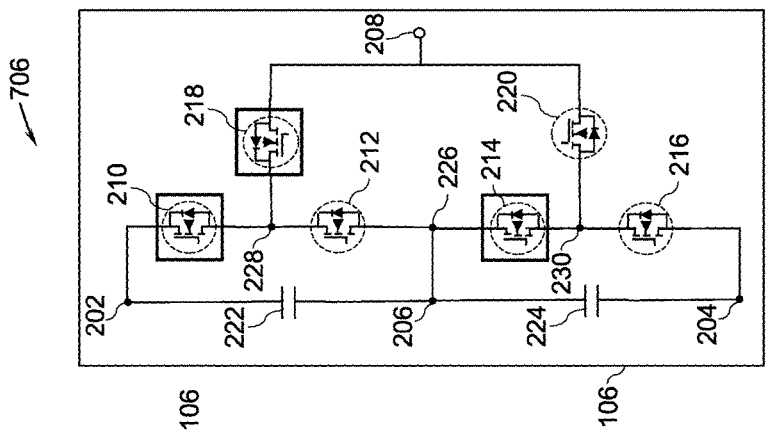
Figure 7B:
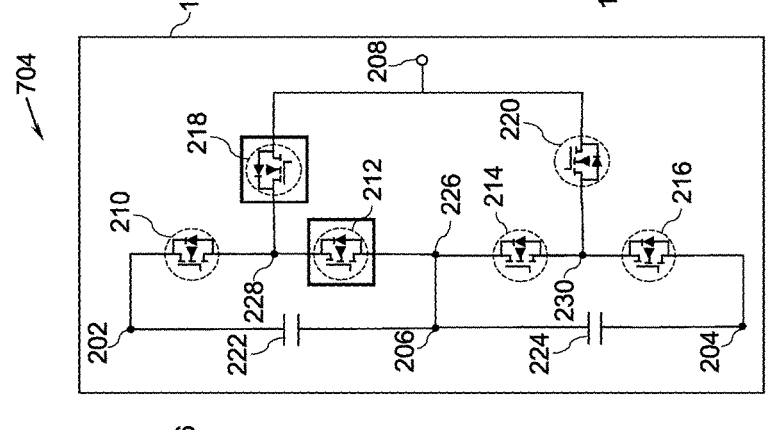
Figure 7C:
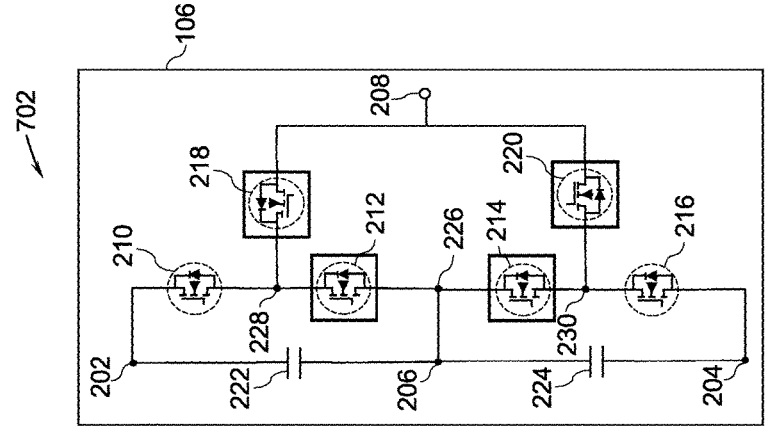
Figure 7E:
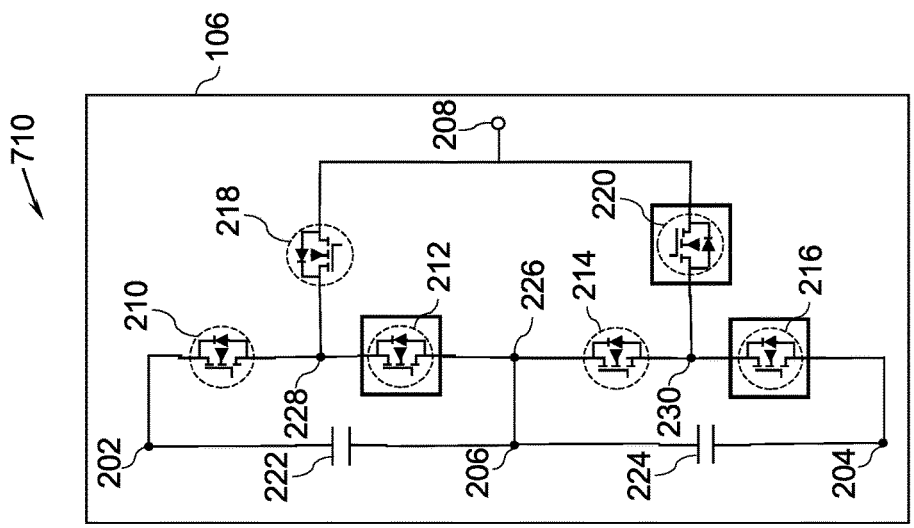
Figure 7D:
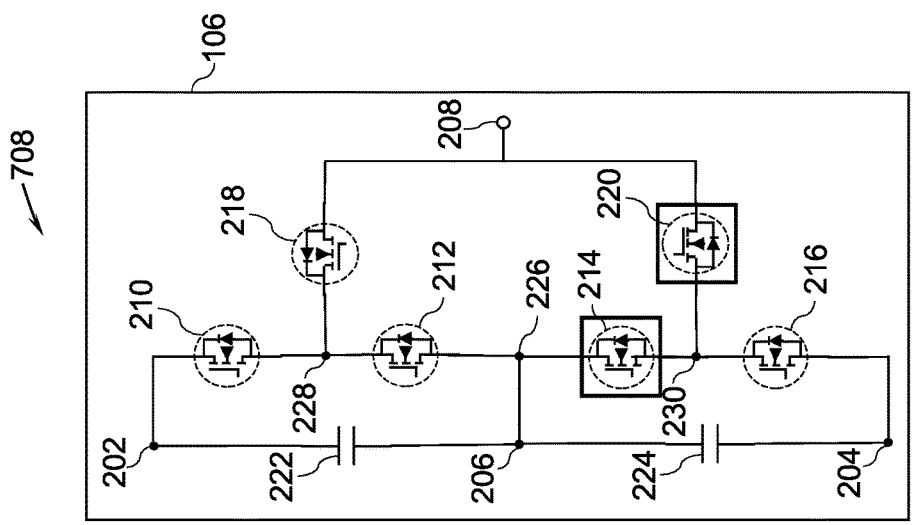

FIG. 6 is a flow-diagram of an example method of operating the phase-leg of FIG. 2 to generate a signal corresponding to a second cycle of the output voltage of FIG. 3, in accordance with aspects of the present specification; and FIGS. 7A, 7B, 7C, 7D, and 7E respectively represent schematic diagrams that depict an operating state of switches of the phase-leg of FIG. 2 in a neutral state, a first intermediate state, a first state, a second intermediate state, and a second state, in accordance with aspects of the present specification.

DETAILED DESCRIPTION

As will be described in detail hereinafter, various embodiments of an exemplary system and method for operating a phase-leg of a three-level active neutral point clamped (3L-ANPC) converter are presented. Use of these systems and methods results in improved life-time of the 3L-ANPC converter. In particular, the systems and methods allow a flow of an electrical current through body diodes of switches of the 3L-ANPC converter for a reduced duration of time in comparison to traditional 3L-ANPC converters resulting in improved life-time of the switches. Moreover, these systems and methods lead to formation of small commutation loops within the phase-leg, thereby reducing an overall loop inductance of the phase-leg of the 3L-ANPC converter. Such a reduction in the overall loop inductance reduces voltage stress across the switches of the 3L-ANPC converter. Consequently, the life-time and the reliability of the 3L-ANPC converter may be improved.

In the effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

When describing elements of the various embodiments of the present specification, the articles "a", "an", "the" and "said" are intended to mean that there are one or more of the elements. The terms "comprising", "including" and "having" are intended to be inclusive and mean that there may be additional elements other than the listed elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
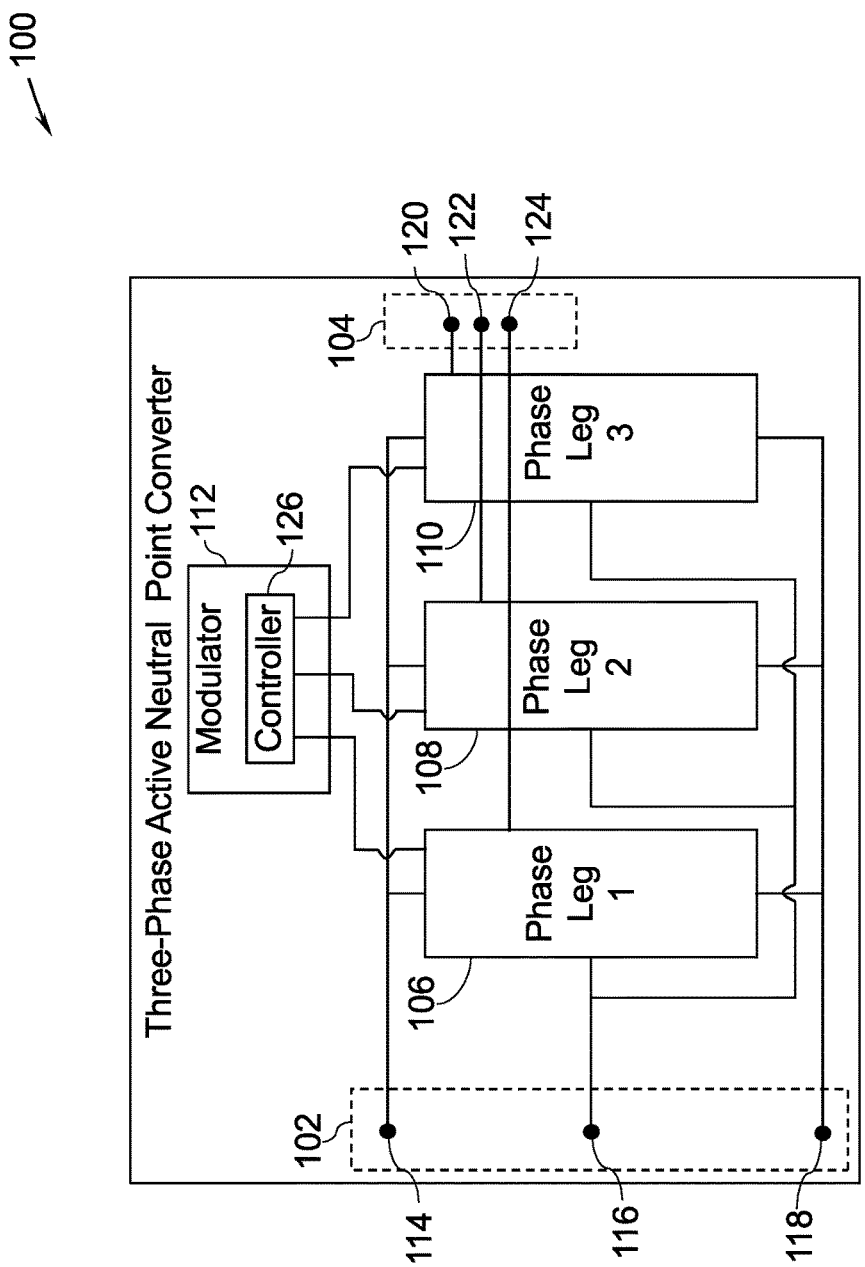
FIG. 1 is a block diagram of a three-level active neutral point clamped (3L-ANPC) converter, in accordance with aspects of the present specification.

FIG. 1 is a block diagram of a three-level active neutral point clamped (3L-ANPC) converter 100, in accordance with aspects of the present specification. By way of a non-limiting example, the 3L-ANPC converter 100 may be an inverter that facilitates conversion of a direct current (DC) power to an alternating current (AC) power. In a presently contemplated configuration, the 3L-ANPC converter 100 includes an input port 102, an output port 104, and one or more phase-legs 106, 108, 110 disposed between the input port 102 and the output port 104. Additionally, the 3L-ANPC converter 100 may also include a modulator 112 that is operatively coupled to the one or more phase-legs 106, 108, 110. The term "power" as used herein may be representative of a voltage, a current, or both the voltage and current.

It may be noted that use of the three phase-legs 106-110 in the 3L-ANPC converter 100 aids in generating a three-phase output at the output port 104. Although the 3L-ANPC converter 100 of FIG. 1 is shown as having the three phase-legs 106-110, use of a 3L-ANPC converter having less than three phase-legs or greater than three phase-legs is also contemplated. For example, a 3L-ANPC converter with one phase-leg may produce a single-phase output voltage. By way of another non-limiting example, a 3L-ANPC converter with two phase-legs may produce a two-phase output voltage.

The input port 102 includes a positive input terminal 114, a neutral input terminal 116, and a negative input terminal 118. These terminals 114, 116, 118 may be hereinafter collectively referred to as input terminals 114-118. The positive input terminal 114 may be maintained at a positive voltage, the negative input terminal 118 may be maintained at a negative voltage, and the neutral input terminal 116 may be maintained at a neutral voltage. In some embodiments, the positive voltage and the negative voltage may be non-zero potentials while the neutral voltage may be a zero potential or substantially close to a zero potential. In certain embodiments, the neutral voltage may also be a non-zero potential. The input terminals 114-118 of the input port 102 are electrically coupled to input terminals (see FIG. 2) of each of the phase-legs 106-110.

In the example of FIG. 1, a three-phase output voltage may be available at the output port 104 of the 3L-ANCP converter 100. The output port 104 includes output terminals 120, 122, 124 to supply the three-phase output voltage to any target electronic device (not shown) coupled to the 3L-ANCP converter 100. More particularly, a single-phase voltage may be supplied via each of the output terminals 120, 122, 124. These terminals 120, 122, 124 may be hereinafter collectively referred to as output terminals 120-124. In some embodiments, output terminals 120-124 of the output port 104 are electrically coupled to an output terminal (see FIG. 2) of each of the phase-legs 106-110. The output voltage at each of the output terminals 120-124 includes three levels such as a first level, a second level, and a neutral level. By way of example, the first level may be a positive voltage level, while the second level may be a negative voltage level. By way of another example, while the first level may be the negative voltage level, the second level may be the positive voltage level. Moreover, the neutral level may be a zero voltage or substantially close to a zero voltage. In certain embodiments, the neutral level may be a non-zero voltage.

The phase-legs 106, 108, 110 are electrically coupled to the input port 102 and the output port 104. Each of the phase-legs 106, 108, 110 is configured to convert the DC power received from the input port 102 to an AC power and supply the generated AC power to the output port 104 as a phase voltage and a phase current. More particularly, the phase-legs 106, 108, 110 are configured to provide the generated AC power to the corresponding output terminal 120, 122, 124. In some embodiments, one or more of the phase-legs 106-110 may include a plurality of switches (see FIG. 2) to facilitate conversion of the DC power to the AC power. The phase-legs 106-110 will be described in greater detail with reference to FIG. 2.

The modulator 112 is operatively coupled to the phase-legs 106-110. In the embodiment of FIG. 1, the modulator 112 is shown as a part of the 3L-ANPC converter 100. In certain embodiments, the modulator 112 may be disposed outside the 3L-ANPC converter 100.

In some embodiments, the modulator 112 may include a controller 126 configured to control operations of the phase-legs 106-110 to facilitate the conversion of the DC power to the AC power by the phase-legs 106-110. The controller 126 may include hardware elements such as a specially programmed general purpose computer, an electronic processor such as a microprocessor, a digital signal processor, and/or a microcontroller. Further, the controller 126 may include input/output ports and a storage medium, such as an electronic memory. Various examples of the microprocessor include, but are not limited to, a reduced instruction set computing (RISC) architecture type microprocessor or a complex instruction set computing (CISC) architecture type microprocessor. Further, the microprocessor may be a single-core type or multi-core type. Alternatively, the controller 126 may be implemented using hardware elements such as circuit boards with processors, logic gates, or as software running on a processor such as a personal computer (PC), or a microcontroller.

The controller 126 may be operatively coupled to the phase-legs 106-110. More particularly, the controller 126 may be operatively coupled to the switches (see FIG. 2) of the phase-legs 106-110 and configured to control switching of the switches to facilitate conversion of the DC power to the AC power. The controller 126 may be configured to operate the phase-legs 106-110 such that loop inductances of the phase-legs 106-110 are reduced, consequently resulting in a reduction in the voltage stress on the switches of the phase-legs 106-110. Implementing the design of the 3L-ANPC converter 100 as described hereinabove results in improved life and reliability of the 3L-ANPC converter 100. The operation of the controller 126 will be described in greater detail with reference to FIGS. 2-7.

Referring now to FIG. 2, a schematic diagram 200 of one embodiment of a phase-leg such as the phase-leg 106 of the 3L-ANPC converter 100 of FIG. 1, in accordance with aspects of the present specification, is presented. In some embodiments, the other phase-legs 108 and 110 may also have a configuration similar to the configuration of the phase-leg 200 depicted in FIG. 2. Also, FIG. 2 will be described with reference to the components of FIG. 1.

In some embodiments, the phase-leg 200 may include a plurality of input terminals such as a first input terminal 202, a second input terminal 204, and a neutral input terminal 206. The phase-leg 200 may also include a plurality of switches and an output terminal 208. The plurality of switches includes a first switch 210, a second switch 212, a third switch 214, a fourth switch 216, a fifth switch 218, and a sixth switch 220. The first switch 210, second switch 212, third switch 214, fourth switch 216, fifth switch 218, and sixth switch 220 are hereinafter collectively referred to as switches 210-220.

Although not depicted in FIG. 2, the first input terminal 202, the second input terminal 204, and the neutral input terminal 206 of the phase-leg 200 may be respectively operatively coupled to the positive input terminal 114, the negative input terminal 118, the neutral input terminal 116 of the 3L-ANPC converter 100 of FIG. 1. Also, the output terminal 208 of the phase-leg 200 may be operatively coupled to the output terminal 124 of the 3L-ANPC converter 100 of FIG. 1. Furthermore, a gate terminal of each of the switches 210-220 may be operatively coupled to the modulator 112 of the 3L-ANPC converter 100. More particularly, the gate terminal of each of the switches 210-220 may be operatively coupled to the controller 126 of the modulator 112.

One embodiment of the phase-leg 200 having six switches 210-220 is depicted in FIG. 2. However, the phase-leg 200 having greater than six or fewer than six switches is also contemplated. Moreover, the switches 210-220 depicted in FIG. 2 are silicon carbide (SiC) metal-oxide-semiconductor field-effect transistors (MOSFETs), where each switch may include a MOSFET element and a body diode. It may be noted that, the phase-leg 200 having other types of switches is also envisioned. Other non-limiting examples of the switches 210-220 include transistors, gate commutated thyristors, field effect transistors, insulated gate bipolar transistors (IGBT), gate turn-off thyristors, static induction transistors, static induction thyristors, or combinations thereof. Furthermore, materials used to form the switches 210-220 may include, but are not limited to, silicon (Si), germanium (Ge), SiC, gallium nitride (GaN), or combinations thereof.

As will be appreciated, an SiC switch module typically includes two switches. Therefore, in some embodiments, three such SiC modules may be used to form the phase-leg 200 of FIG. 2. By way of example, the switches 210 and 212 may belong to a first SiC switch module (not shown), the switches 214 and 216 may belong to a second SiC switch module (not shown), and the switches 218 and 220 may belong to a third SiC switch module (not shown). It may be noted that other types of SiC switch modules may also be used without limiting the scope of the present specification.

As depicted in FIG. 2, the first switch 210, the second switch 212, the third switch 214, and the fourth switch 216 are operatively coupled in series. More particularly, the switches 210-216 are coupled in series such that a source terminal of the first switch 210 is connected to a drain terminal of the second switch 212, a source terminal of the second switch 212 is connected to a drain terminal of the third switch 214, and a source terminal of the third switch 214 is connected to a drain terminal of the fourth switch 216. Further, the first switch 210 is operatively coupled to the first input terminal 202 and the fourth switch 216 is operatively coupled to the second input terminal 204. More particularly, as depicted in FIG. 2, a drain terminal of the first switch 210 is connected to the first input terminal 202, while a source terminal of the fourth switch 216 is connected to the second input terminal 204.

Furthermore, reference numeral 226 represents an interconnection point of the second switch 212 and the third switch 214. The interconnection point 226 is operatively coupled to the neutral input terminal 206. Also, reference numeral 228 represents an interconnection point of the first switch 210 and the second switch 212. The fifth switch 218 is operatively coupled between the interconnection point 228 and the output terminal 208. More particularly, in the example of FIG. 2, a drain terminal of the fifth switch 218 is connected to the interconnection point 228 and a source terminal of the fifth switch 218 is connected to the output terminal 208. Moreover, reference numeral 230 represents an interconnection point of the third switch 214 and the fourth switch 216. The sixth switch 220 is operatively coupled between the interconnection point 230 and the output terminal 208. In particular, a source terminal of the sixth switch 220 is connected to the interconnection point 230 and a drain terminal of the sixth switch 220 is connected to the output terminal 208.

Moreover, in some embodiments, the phase-leg 200 may also include capacitors 222 and 224. The capacitor 222 is connected between the first input terminal 202 and the neutral input terminal 206. Also, the capacitor 224 is connected between the second input terminal 204 and the neutral input terminal 206.

Figure 4:
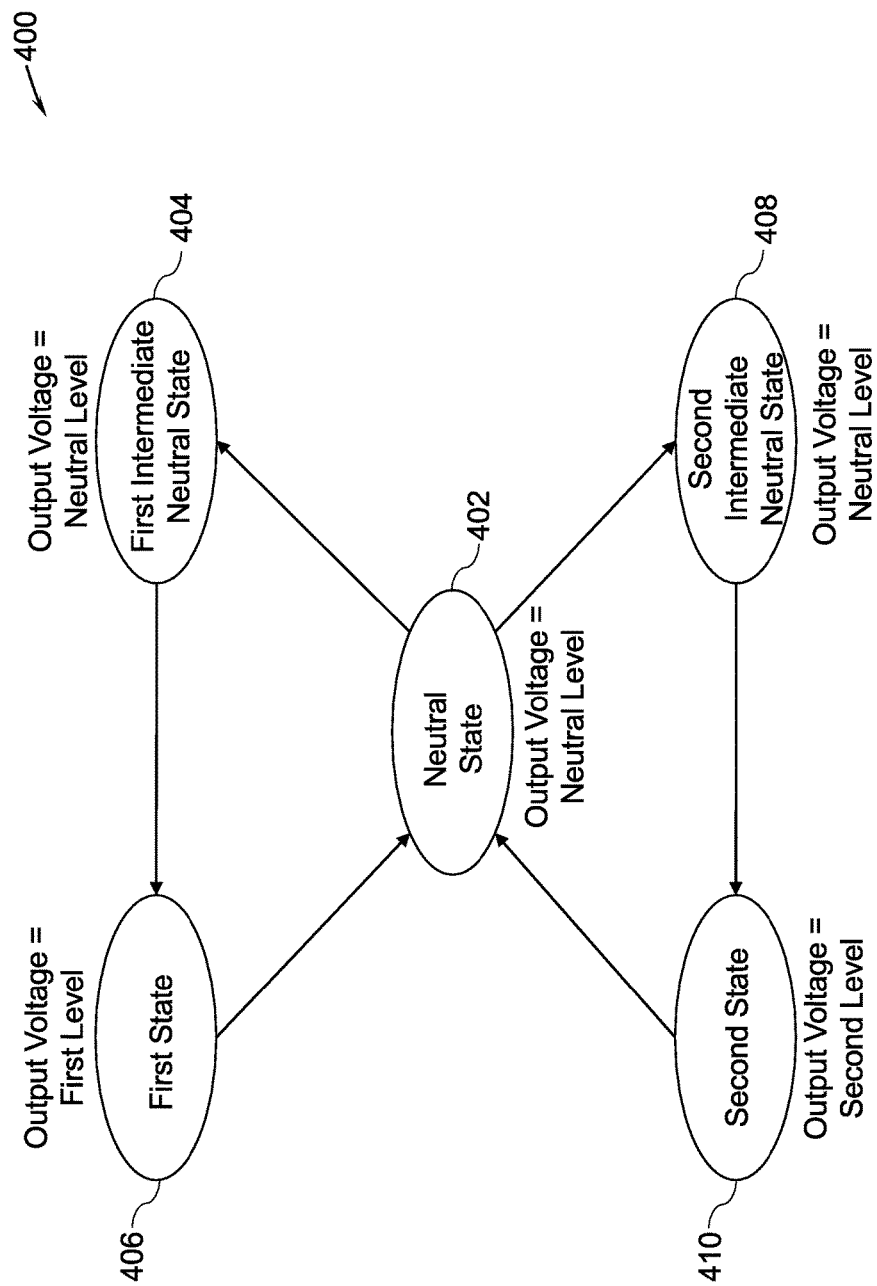
FIG. 4 is a state diagram depicting transitions of an operating state of the phase-leg of FIG. 2 to generate the output voltage of FIG. 3, in accordance with aspects of the present specification.

The controller 126 may be configured to operate the phase-leg 200 in one or more operating states including, but not limited to, a neutral state, a first intermediate neutral state, a first state, a second intermediate neutral state, or a second state (see FIG. 4). In some embodiments, the phase-leg 200, when operated in any of the neutral state, the first intermediate neutral state, or the second intermediate neutral state, may be configured to generate an output voltage having the neutral level at the output terminal 208. Moreover, the phase-leg 200, when operated in the first state, may be configured to generate the output voltage having the first level at the output terminal 208. In a similar fashion, the phase-leg 200, when operated in the second state, may be configured to generate the output voltage having the second level at the output terminal 208. A signal representative of an example output voltage of the phase-leg 200 is depicted in FIG. 3.

To transition the phase-leg 200 between the neutral state, the first intermediate neutral state, the first state, the second intermediate neutral state, and the second state, the controller 126 may be configured to selectively operate one or more of the switches 210-220 in a conducting state and operate the remaining switches in a non-conducting state. As will be appreciated, the switches operated in the conducting state allow an electrical current to pass through, while the switches operated in the non-conducting state block a flow of the electrical current therethrough. The controller 126 is configured to operate any switch in the conducting state or the non-conducting state by applying a control signal to the gate terminal of that switch 210-220.

In the embodiment of FIG. 2, the switches 210-220 are N-channel SiC MOSFETs. Accordingly, to operate any of the switches 210-220 in the conducting state, it is desirable to supply a control signal having a higher magnitude (H) to a corresponding gate terminal. It may be noted that the control signal having the higher magnitude is representative of a control signal having a magnitude that is greater than a magnitude of a signal provided to a corresponding source terminal. Similarly, to operate any of the switches 210-220 in the non-conducting state, it is desirable to supply a control signal having a lower magnitude (L) to the corresponding gate terminal. It may be noted that the control signal having the lower magnitude is representative of a control signal having a magnitude that is lower than a magnitude of a signal provided to a corresponding source terminal. Moreover, it may be noted that if P-channel SiC MOSFETs are used as the switches 210-220, the levels of the control signals may be interchanged.

Accordingly, to operate any of the switches 210-220 in the conducting state, the controller 126 may be configured to supply a control signal having the higher magnitude to the gate terminals of the respective switches. Similarly, to operate any of the switches 210-220 in the non-conducting state, the controller 126 may be configured to supply a control signal having the lower magnitude (L) to the gate terminals of the respective switches.

During operation of the phase-leg 200, commutation loops are created when one or more switches 210-220 are transitioned from the conducting state to the non-conducting state or vice-versa. An inductance of such a commutation loop is referred to as a loop inductance.

Typically, in traditional 3L-ANPC converters, large commutation loops or both the large commutation loops and small commutation loops are formed in any phase-leg. As will be appreciated, the loop inductance increases with an increase in a length of the commutation loop. Consequently, the traditional 3L-ANPC converters exhibit increased loop inductance. Disadvantageously, the increased loop inductance adversely impacts switching speed of switches of the traditional 3L-ANPC converters and also increases voltage stress on the switches of the traditional 3L-ANPC converters.

The controller 126 of the modulator 112 may be configured to operate the phase-leg 200 such that small commutation loops are formed in the phase-leg 200. Consequently, the loop inductance of the phase-leg 200 in one or more of the operating states is reduced in comparison to the loop inductance experienced by the traditional 3L-ANPC converters. The reduction in the loop inductance in turn reduces voltage stress on the switches 210-220 of the phase-leg 200. Moreover, the controller 126 may be configured to operate the switches 210-220 such that the body diodes of the switches 210-220 do not conduct currents for extended periods of time. For example, in the configuration of FIG. 2, the body diodes of some of the switches 210-220 conduct current merely for a few microseconds. Consequently, the body diodes of these switches 210-220 are protected from adverse effects of flow of current therethrough. Advantageously, such an operation of the phase-leg 200 results in improved life and reliability of the phase-leg 200 and the 3L-ANPC converter 100.

Furthermore, in accordance with the aspects of the present specification, the phase-leg 200 is additionally operated in a first intermediate state and a second intermediate state in comparison to the phase-legs of the traditional 3L-ANPC converters. Also, it may be noted that the phase-leg 200 is configured to be operated in the first and second intermediate states for a short duration, for example, a few microseconds. Typically, body diodes in the switches 210-220 are not designed for carrying current for long durations. In the traditional 3L-ANPC converters, body diodes of some switches conduct current for long durations especially while an output voltage having a neutral level is generated by the traditional 3L-ANPC converters. In accordance with the aspects of the present specification, when the phase-leg 200 is operated in a first intermediate state or a second intermediate state for a short duration, the switches 218, 220 also operate in the non-conducting state for the short duration. Advantageously, operating the phase-leg 200 in the first and second intermediate states for short durations aids in reducing the time during which the body diodes of the switches 218, 220 conduct current. Hence, the body diodes of the switches 218, 220 are protected from adverse effects of current flowing therethrough. Consequently, the reliability and useful life of the 3L-ANPC converter 100 is improved in comparison to the reliability and useful life of the traditional 3L-ANPC converters.

FIG. 3 is a graphical representation 300 depicting an example signal that represents an output voltage 302 of a phase-leg such as the phase-leg 200, in accordance with aspects of the present specification. FIG. 3 is described with reference to the components of FIG. 2.

The output voltage 302 may be obtained at the output terminal 208 of the phase-leg 200. Reference numeral 304 represents an X-axis and the reference numeral 306 represents a Y-axis. The X-axis 304 and the Y-axis 306 respectively represent time and an amplitude of the output voltage 302. Further, reference numerals 308, 310, and 312 represent a first level, a second level, and a neutral level, respectively, of the output voltage 302. Moreover, reference numerals 314 and 316 respectively represent a first cycle and a second cycle of the output voltage 302. For ease of illustration, two cycles 314, 316 of the output voltage 302 are represented in FIG. 3. It may be noted that output voltage 302 may include more than two cycles. Further, in the example of FIG. 3, the first cycle 314 is shown as a positive cycle while the second cycle 316 is shown as a negative cycle. Use of the phase-leg 200 to generate the output voltage 302 having any number of first cycles 314, any number of second cycles 316, or any combination or pattern of the first and second cycles 314, 316 is also envisioned. Moreover, use of the phase-leg 200 to generate the output voltage 302 having only the first cycles 314 or only the second cycles 316 is also envisioned.

In FIG. 3, $T_0$ represents a total time corresponding to a neutral state of the phase-leg 200. Also, $T_{min}$ represents a minimum pulse duration corresponding to any of the first, second, and third levels 308, 310, 312 of the output voltage 302, and $T_s$ represents a time period of a single cycle such as the first cycle 314 or the second cycle 316 of the output voltage 302 of the phase-leg 200.

FIG. 4 is a state diagram 400 depicting transitions of an operating state of the phase-leg 200 of FIG. 2 to generate the output voltage 302 of FIG. 3, in accordance with aspects of the present specification. FIG. 4 is described in conjunction with FIGS. 2 and 3. The operating states such as the neutral state, the first intermediate neutral state, the first state, the second intermediate neutral state, and the second state are represented by reference numerals 402, 404, 406, 408, and 410, respectively. The arrows are used to generally indicate a subsequent operating state corresponding to a given operating state.

During operation of the phase-leg 200, at time t=0, if it is assumed that the phase-leg 200 is operating in the neutral state 402 and the output voltage 302 having the first level 308 is desired as depicted in the first cycle 314, the controller 126 is configured to transition the phase-leg 200 to the first intermediate neutral state 404 and subsequently to the first state 406. Further, the controller 126 is configured to maintain the phase-leg 200 in the first state 406 for a first determined time duration (see Table-2). The first determined time duration may be computed by the controller 126 based on a desired frequency and duty-cycle of the output voltage 302. Subsequent to the lapse of the first determined time duration, the controller 126 is configured to transition the phase-leg 200 back to the neutral state 402. In one embodiment, as depicted in FIG. 4, the controller 126 may be configured to transition the phase-leg 200 directly to the neutral state 402 from the first state 406. In an alternative embodiment, the controller 126 may be configured to transition the phase-leg 200 to the neutral state 402 from the first state 406 via the first intermediate neutral state 404.

Moreover, to generate the output voltage 302 having the second level 310, the controller 126 is configured to transition the phase-leg 200 to second intermediate neutral state 408 and subsequently to the second state 410. Further, the controller 126 may be configured to maintain the phase-leg 200 in the second state 410 for a second determined time duration. The second determined time duration may be computed by the controller 126 based on a desired frequency and duty-cycle of the output voltage 302. Subsequent to the lapse of the second determined time duration, the controller 126 may be configured to transition the phase-leg 200 back to the neutral state 402. In one embodiment, as depicted in FIG. 4, the controller 126 may be configured to transition the phase-leg 200 directly to the neutral state 402 from the second state 410. Alternatively, the controller 126 may be configured to transition the phase-leg 200 to the neutral state 402 from the second state 410 via the second intermediate neutral state 408.

Table 1 illustrates levels of the output voltage 302 corresponding to the operating states 402-410. Also, Table 2 illustrates non-limiting examples of determined time durations corresponding to the operating states 402-410.

TABLE 1

| Operating state of the phase-leg 200 | Level of the output voltage 302 |
|---|---|
| Neutral state 402 | Neutral level 312 |
| First intermediate neutral state 404 | Neutral level 312 |
| First state 406 | First level 308 |
| Second intermediate neutral state 408 | Neutral level 312 |
| Second state 410 | Second level 310 |

TABLE 2

| $T_0$ | Neutral state 402 | First intermediate neutral state 404 OR second intermediate neutral state 408 | First state 406 OR second state 410 |
|---|---|---|---|
| $0 < T_0 < T_{min}$ | 0 | $T_{min}$ | $T_s - T_{min}$ |
| $T_{min} < T_0 < 2T_{min}$ | 0 | $T_0$ | $T_s - T_0$ |
| $2T_{min} < T_0 < 3T_{min}$ | $T_0 - T_{min}$ | $T_{min}$ | $T_s - T_0$ |
| $3T_{min} < T_0 < 4T_{min}$ | $T_0 - 2T_{min} + T_{min}$ | $T_{min}$ | $T_s - T_0$ |
| $4T_{min} < T_0$ | $T_0/2 - T_{min} + T_0/2$ | $T_{min}$ | $T_s - T_0$ |

Column 1 of Table 2 represents example scenarios indicating different ranges of the total time $T_0$ corresponding to the neutral state 402. Columns 2-4 of Table 2 represent time durations of the operating states 402-410 that correspond to the value of $T_0$ in column 1. As noted hereinabove, the minimum pulse duration $T_{min}$ represents a minimum time duration required for any of the levels 308, 310, 312. Accordingly, if the total time $T_0$ for the neutral state 402 is less than the minimum pulse duration $T_{min}$ (see, row 1 of Table 2), the time duration corresponding to the first level 308 and hence the first state 406, or the second level 310 and hence the second state 410 may be adjusted to a value of $(T_s-T_{min})$. This adjustment may be performed because the minimum pulse duration $T_{min}$ is required to facilitate generation of the neutral level 312. The neutral level 312 may be generated by operating the phase-leg 200 in the neutral state 402, the first intermediate neutral state 404, and the second intermediate neutral state 408.

Advantageously, operating the phase-leg 200 in the first intermediate neutral state 404 while transitioning from the neutral state 402 to the first state 406 or vice-versa and operating the phase-leg 200 in the second intermediate neutral state 404 while transitioning from the neutral state 402 to the second state 410, or vice-versa, result in small commutation loops in the phase-leg 200 due to corresponding switching of the switches 210-220 as described hereinabove. Consequent to operating the phase-leg 200 with such small commutation loops, the overall loop inductance of the phase-leg 200 at any given point of time is reduced. This reduction in the overall loop inductance reduces voltage stress across the switches 210-220 of the phase-leg 200. Consequently, the life-time and the reliability of the switches 210-220 and the 3L-ANPC converter 100 may be improved.

Figure 5:
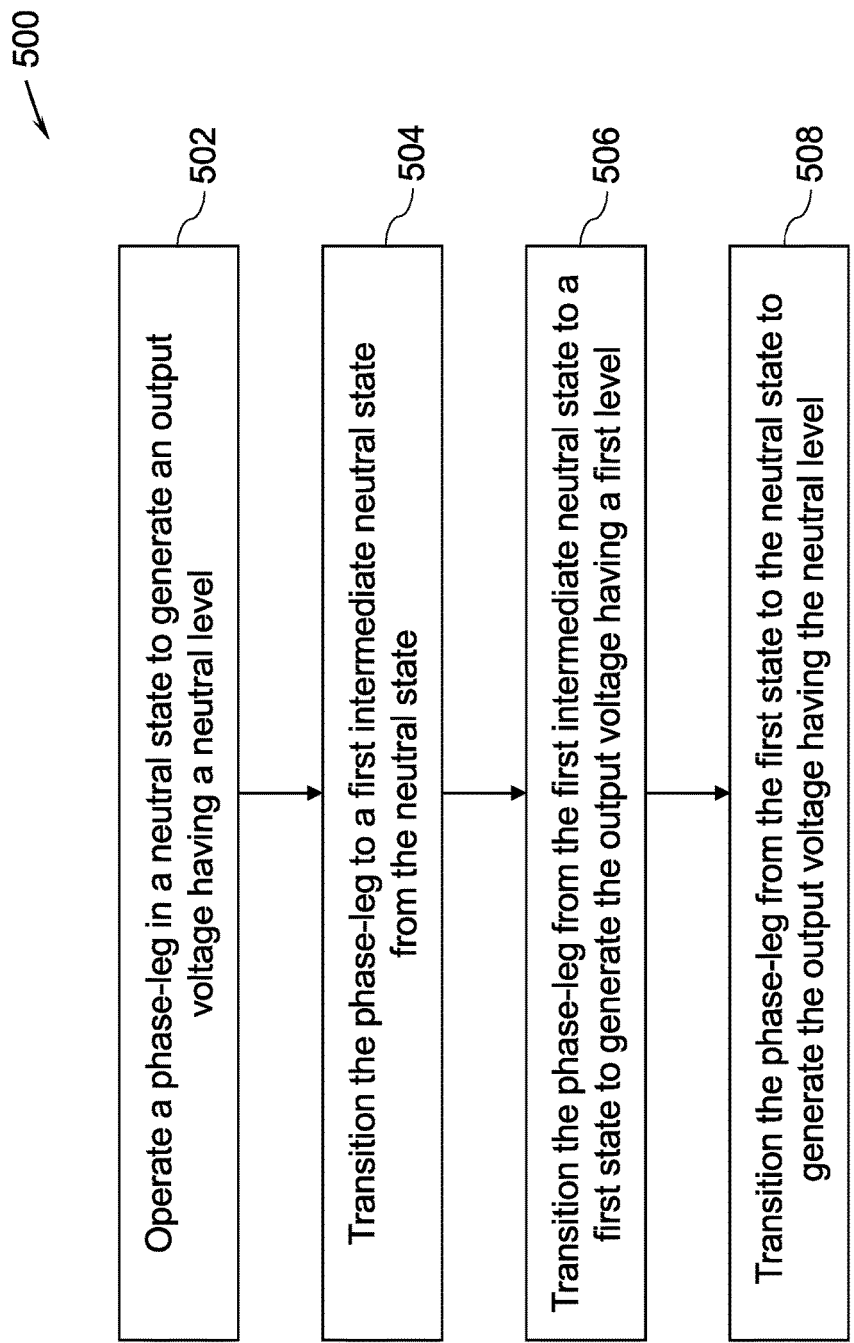
FIG. 5 is a flow-diagram of an example method of operating the phase-leg of FIG. 2 to generate a signal corresponding to a first cycle of the output voltage of FIG. 3, in accordance with aspects of the present specification.

FIG. 5 is a flow-diagram 500 of an example method of operating a phase-leg 200 to generate a signal such as a first cycle of an output voltage at an output terminal of the phase-leg 200, in accordance with aspects of the present specification. In particular, FIG. 5 represents a method of operating the phase-leg 200 (see FIG. 2) to generate the first cycle 314 (see FIG. 3) of the output voltage 302 (see FIG. 3) at the output terminal 208 (see FIG. 2) of the phase-leg 200. FIG. 5 is described with respect to operation of the phase-leg 200. It may be noted that the phase-legs 106, 108, 110 of FIG. 1 may also be operated in a similar fashion with an appropriate phase difference. FIG. 5 is described in conjunction with FIGS. 1-4.

At step 502, the phase-leg 200 is operated in the neutral state 402 to generate the output voltage 302 having the neutral level 312. To operate the phase-leg 200 in the neutral state 402, the controller 126 is configured to operate the second switch 212, the third switch 214, the fifth switch 218, and the sixth switch 220 in a conducting state and the first switch 210 and the fourth switch 216 in a non-conducting state (see FIG. 7A). In the neutral state 402, the phase-leg 200 generates the output voltage having the neutral level 312. It may be noted that in the neutral state 402, since the switches 212, 214, 220, and 218 are operated in the conducting state, the body diodes of these switches 212, 214, 220, and 218 do not conduct any current. Therefore, the life-time and reliability of the switches 212, 214, 220, and 218 and hence, the life-time and reliability of the 3L-ANPC converter 100 may be improved.

Further, at step 504, the phase-leg 200 is transitioned to the first intermediate neutral state 404 from the neutral state 402. Accordingly, the controller 126 is configured to transition the third switch 214 and the sixth switch 220 to the non-conducting state. Hence, in the first intermediate neutral state 404, while the second switch 212 and the fifth switch 218 are operated in the conducting state, the first switch 210, the third switch 214, the fourth switch 216, and the sixth switch 220 are operated in the non-conducting state (see FIG. 7B). In the first intermediate neutral state 404, the phase-leg 200 continues to generate the output voltage having the neutral level 312.

Furthermore, at step 506, the phase-leg 200 is transitioned from the first intermediate neutral state 404 to the first state 406 to generate the output voltage 302 having the first level 308. To effect this transition of the phase-leg 200, the controller 126 is configured to transition the first switch 210 and the third switch 214 to the conducting state and transition the second switch 212 to the non-conducting state. Accordingly, in the first state 406, while the first switch 210, the third switch 214, and the fifth switch 218 are operated in the conducting state, the second switch 212, the fourth switch 216, and the sixth switch 220 are operated in the non-conducting state (see FIG. 7C).

As noted hereinabove with reference to step 504, to transition the phase-leg 200 from the neutral state 402 to the first intermediate neutral state 404, the switches 212 and 218 are operated in the conducting state, while the switches 214 and 220 are transitioned to the non-conducting state. This transition of the switches 214, 220 results in reduced voltage stress across the switches 214 and 220 in comparison to voltage stress experienced by switches in the traditional 3L-ANPC converters. Moreover, the phase-leg 200 may be operated in the first intermediate neutral state 404 for a short period of time such as for a few microseconds, after which the switches 214 and 220 are transitioned to the conducting state to transition the phase-leg 200 to the first state 406. Accordingly, the body diodes of the switches 214, 220 need to conduct a current during that short duration corresponding to the first intermediate neutral state 404, thereby resulting in an increased life-time of the switches 214, 220 in comparison to the switches of the traditional 3L-ANPC converters.

Moreover, at step 508, the phase-leg 200 is transitioned from the first state 406 to the neutral state 402 to generate the output voltage 302 having the neutral level 312. As previously noted, in the neutral state 402, the controller 126 is configured to operate the second switch 212, the third switch 214, the fifth switch 218, and the sixth switch 220 in a conducting state and the first switch 210 and the fourth switch 216 in a non-conducting state.

In some embodiments, the controller 126 may be configured to transition the phase-leg 200 directly to the neutral state 402 from the first state 406. To transition the phase-leg 200 directly to the neutral state 402 from the first state 406, the controller 126 is configured to transition the second switch 212 and the sixth switch 220 to the conducting state and transition the first switch 210 to the non-conducting state.

In certain other embodiments, the controller 126 may be configured to transition the phase-leg 200 to the neutral state 402 from the first state 406 via the first intermediate neutral state 404. In this example, the controller 126 is configured to first transition the phase-leg 200 from the first state 406 to the first intermediate neutral state 404 and subsequently transition the phase-leg 200 from the first intermediate neutral state 404 to the neutral state 402. Accordingly, the controller 126 is configured to first transition the second switch 212 to the conducting state and transition the first switch 210 and the third switch 214 to the non-conducting state to facilitate transition of the phase-leg 200 from the first state 406 to the first intermediate neutral state 404. Further, the controller 126 is configured to transition the third switch 214 and the sixth switch 220 to the conducting state to transition the phase-leg 200 from the first intermediate neutral state 404 to the neutral state 402.

FIG. 6 is a flow-diagram 600 of an example method of operating a phase-leg 200 to generate a signal such as a second cycle of an output voltage at an output terminal of the phase-leg 200, in accordance with aspects of the present specification. In particular, FIG. 6 represents a method of operating the phase-leg 200 (see FIG. 2) to generate the second cycle 316 (see FIG. 3) of the output voltage 302 (see FIG. 3) at the output terminal 208 (see FIG. 2) of the phase-leg 200. FIG. 6 is described with respect to operation of the phase-leg 200. It may be noted that the phase-legs 106, 108, 110 of FIG. 1 may also be operated in a similar fashion with an appropriate phase difference. FIG. 5 is described in conjunction with FIGS. 1-4.

At step 602, the phase-leg 200 is operated in the neutral state 402 to generate the output voltage 302 having the neutral level 312. Further, at step 604, the phase-leg 200 may be transitioned from the neutral state 402 to the second intermediate neutral state 408. To transition the phase-leg 200 from the neutral state 402 to the second intermediate neutral state 408, the controller 126 may be configured to transition the second switch 212 and the fifth switch 218 to the non-conducting state. Accordingly, in the second intermediate neutral state 408, the third switch 214 and the sixth switch 220 are operated in the conducting state, whereas the first switch 210, the second switch 212, the fourth switch 216, and the fifth switch 218 are operated in the non-conducting state (see FIG. 7D). Consequently, in the second intermediate neutral state 408, the phase-leg 200 generates the output voltage having the neutral level 312.

Moreover, at step 606, the phase-leg 200 is transitioned from the second intermediate neutral state 408 to the second state 410 to generate the output voltage having the second level 310. Accordingly, the controller 126 may be configured to transition the second switch 212 and the fourth switch 216 to the conducting state and transition the third switch 214 to the non-conducting state. Hence, in the second state 410, the second switch 212, the fourth switch 216, and the sixth switch 220 are operated in the conducting state, whereas the first switch 210, the third switch 214, and the fifth switch 218 are operated in the non-conducting state (see FIG. 7E).

As noted hereinabove with reference to step 604, to transition the phase-leg 200 from the neutral state 402 to the second intermediate neutral state 408, the switches 214 and 220 are operated in the conducting state, while the switches 212 and 218 are transitioned to the non-conducting state. This transition of the switches 212, 218 results in reduced voltage stress across the switches 212, 218 in comparison to voltage stress experienced by switches in the traditional 3L-ANPC converters. In addition, the phase-leg 200 may be operated in the second intermediate neutral state 408 for a short period of time such as for a few microseconds, after which the switches 212 and 218 are transitioned to the conducting state to transition the phase-leg 200 to the second state 410. Accordingly, the body diodes of the switches 212, 218 need to conduct a current during that short duration corresponding to the second intermediate neutral state 408, thereby resulting in an increased life-time of the switches 212, 218 in comparison to the switches of the traditional 3L-ANPC converters.

Additionally, at step 608, the phase-leg 200 is transitioned from the second state 410 to the neutral state 402. As previously noted, in the neutral state 402, the controller 126 is configured to operate the second switch 212, the third switch 214, the fifth switch 218, and the sixth switch 220 in a conducting state and the first switch 210 and the fourth switch 216 in a non-conducting state (see FIG. 7A).

In some embodiments, the controller 126 may be configured to transition the phase-leg 200 directly to the neutral state 402 from the second state 410. To transition the phase-leg 200 from the second state 410 to the neutral state 402, the controller 126 is configured to transition the third switch 214 and the fifth switch 218 to the conducting state and transition the fourth switch 216 to the non-conducting state.

In certain other embodiments, the controller 126 may be configured to transition the phase-leg 200 to the neutral state 402 from the second state 410 via the second intermediate neutral state 408. In this example, the controller 126 is configured to first transition the phase-leg 200 from the second state 410 to the second intermediate neutral state 408 and subsequently transition the phase-leg 200 from the second intermediate neutral state 408 to the neutral state 402. Accordingly, the controller 126 is configured to first transition the second switch 212 and the fourth switch 216 to the non-conducting state and transition the third switch 214 to the conducting state to facilitate the transition of the phase-leg 200 from the second state 410 to the second intermediate neutral state 408. Further, the controller 126 is configured to transition the second switch 212 and the fifth switch 218 to the conducting state to transition the phase-leg 200 from the second intermediate neutral state 408 to the neutral state 402.

Moreover, in some embodiments, the method of FIG. 6 may be executed after the execution of the method of FIG. 5 to generate the output voltage 302 as depicted in FIG. 3. Also, in certain embodiments, the methods of FIG. 5 and FIG. 6 may be alternatively repeated to generate the output voltage including alternate first and second cycles 314, 316. Additionally, in certain other embodiments, the methods of FIG. 5 and FIG. 6 may be executed in a predetermined pattern to generate the output voltage having the predetermined pattern of the first and second cycles 314, 316.

FIGS. 7A, 7B, 7C, 7D, and 7E respectively represent schematic diagrams 702, 704, 706, 708, 710 that depict operating state the switches 210-220 of the phase-leg 200 of FIG. 2. In particular, FIGS. 7A-7E respectively represent the operating state of the switches 210-222 in the neutral state 402, the first intermediate state 404, and the first state 406, the second intermediate state 408, and the second state 410 (see FIG. 4) of the phase-leg 200, in accordance with aspects of the present specification. It may be noted that in FIGS. 7A-7E, only the switches that operate in the conducting state are marked with an encompassing square. Table 3 summarizes the operating state of the switches 210-220 corresponding to the operating states 402-408.

TABLE 3

| Operating state of the phase-leg 200 | Operating state of switches 210-220 | |
|---|---|---|
| | Conducting state | Non-conducting state |
| Neutral state 402 (see FIG. 7A) | Switches 212, 214, 218, 220 | Switches 210, 216 |
| First intermediate neutral state 404 (see FIG. 7B) | Switches 212, 218 | Switches 210, 214, 216, 220 |
| First state 406 (see FIG. 7C) | Switches 210, 214, 218 | Switches 212, 216, 220 |
| Second intermediate neutral state 408 (see FIG. 7D) | Switches 214, 220 | Switches 210, 212, 216, 218 |
| Second state 410 (see FIG. 7E) | Switches 212, 216, 220 | Switches 210, 214, 218 |

The systems and methods for operating the phase-leg(s) 106-110 of the 3L-ANPC converter described hereinabove facilitate an operation of the 3L-ANPC converter with reduced loop inductances in comparison to the traditional 3L-ANPC converters. Moreover, in the 3L-ANPC converter of the present specification, some of the switches are operated such that the corresponding body diodes do not conduct current for long periods of time, thereby protecting the body diodes. Consequently, switching losses, voltage stresses, and an effect of the current through the body diodes corresponding to one or more of the switches are greatly reduced, thereby leading to a highly reliable operation of the 3L-ANPC converter. Furthermore, the reduction in the overall switching losses leads to enhanced efficiency of the 3L-ANPC converter of the present specification in comparison to the traditional 3L-ANPC converters.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be limited by the foregoing description, but is only limited by the scope of the appended claims.

The invention claimed is:

1. A method for operating a phase-leg of a three-level active neutral point clamped converter, the phase-leg comprising an output terminal, a plurality of input terminals, and a plurality of switches disposed between the plurality of input terminals and the output terminal, the method comprising:
    operating the phase-leg in a neutral state to generate an output voltage having a neutral level by operating a second switch, a third switch, a fifth switch, and a sixth switch of the plurality of switches in a conducting state and operating a first switch and a fourth switch of the plurality of switches in a non-conducting state;
    transitioning the phase-leg to a first intermediate neutral state from the neutral state by operating the second switch and the fifth switch in the conducting state and operating the first switch, the third switch, the fourth switch, and the sixth switch in the non-conducting state; and
    transitioning the phase-leg from the first intermediate neutral state to a first state to generate the output voltage having a first level by operating the first switch, the third switch, and the fifth switch in the conducting state and operating the second switch, the fourth switch, and the sixth switch in the non-conducting state.

2. The method of claim 1, wherein the plurality of input terminals comprises a first input terminal, a second input terminal, and a neutral input terminal, wherein the first switch, the second switch, the third switch, and the fourth switch of the plurality of switches are operatively coupled in series, and wherein the first switch is operatively coupled to the first input terminal, the fourth switch is operatively coupled to the second input terminal, an interconnection point of the second switch and the third switch is operatively coupled to the neutral input terminal, the fifth switch is operatively coupled between an interconnection point of the first switch and the second switch and the output terminal, and the sixth switch is operatively coupled between an interconnection point of the third switch and the fourth switch and the output terminal.

3. The method of claim 1, wherein the first level comprises a positive voltage level.

4. The method of claim 1, wherein transitioning the phase-leg to the first intermediate neutral state from the neutral state comprises transitioning the third switch and the sixth switch to the non-conducting state.

5. The method of claim 1, wherein transitioning the phase-leg from the first intermediate neutral state to the first state comprises transitioning the first switch and the third switch to the conducting state and transitioning the second switch to the non-conducting state.

6. The method of claim 1, further comprising transitioning the phase-leg from the first state to the neutral state.

7. The method of claim 6, wherein transitioning the phase-leg from the first state to the neutral state comprises:
    transitioning the phase-leg from the first state to the first intermediate neutral state; and
    transitioning the phase-leg from first intermediate neutral state to the neutral state.

8. The method of claim 6, wherein transitioning the phase-leg from the first state to the neutral state comprises transitioning the phase-leg directly to the neutral state from the first state.

9. The method of claim 6, further comprising transitioning the phase-leg from the neutral state to a second intermediate neutral state, wherein transitioning the phase-leg from the neutral state to the second intermediate neutral state comprises operating the third switch and the sixth switch in the conducting state and operating the first switch, the second switch, the fourth switch, and the fifth switch in the non-conducting state.

10. The method of claim 9, wherein transitioning the phase-leg from the neutral state to the second intermediate neutral state comprises transitioning the second switch and the fifth switch to the non-conducting state.

11. The method of claim 9, further comprising transitioning the phase-leg from the second intermediate neutral state to a second state to generate the output voltage having a second level, wherein transitioning the phase-leg from the second intermediate neutral state to the second state comprises operating the second switch, the fourth switch, and the sixth switch in the conducting state and operating the first switch, the third switch, and the fifth switch in the non-conducting state.

12. The method of claim 11, wherein transitioning the phase-leg from the second intermediate neutral state to the second state comprises transitioning the second switch and the fourth switch to the conducting state and transitioning the third switch to the non-conducting state.

13. The method of claim 11, wherein the second level comprises a negative voltage level.

14. The method of claim 11, further comprising transitioning the phase-leg from the second state to the neutral state.

15. The method of claim 14, wherein transitioning the phase-leg from the second state to the neutral state comprises:
  transitioning the phase-leg from the second state to the second intermediate neutral state; and
  transitioning the phase-leg from second intermediate neutral state to the neutral state.

16. The method of claim 14, wherein transitioning the phase-leg from the second state to the neutral state comprises transitioning the phase-leg directly to the neutral state from the second state.

17. A modulator for operating a phase-leg of a three-level active neutral point clamped converter, the phase-leg comprising an output terminal, a plurality of input terminals, and a plurality of switches disposed between the plurality of input terminals and the output terminal, the modulator comprising:
  a controller operatively coupled to the plurality of switches and configured to:
    operate the phase-leg in a neutral state to generate an output voltage having a neutral level by operating a second switch, a third switch, a fifth switch, and a sixth switch of the plurality of switches in a conducting state and operating a first switch and a fourth switch of the plurality of switches in a non-conducting state;
    transition the phase-leg to a first intermediate neutral state from the neutral state by operating the second switch and the fifth switch in the conducting state and operating the first switch, the third switch, the fourth switch, and the sixth switch in the non-conducting state; and
    transition the phase-leg from the first intermediate neutral state to a first state to generate the output voltage having a first level by operating the first switch, the third switch, and the fifth switch in the conducting state and operating the second switch, the fourth switch, and the sixth switch in the non-conducting state.

18. The modulator of claim 17, wherein the controller is further configured to:
  transition the phase-leg from the first state to the neutral state;
  transition the phase-leg from the neutral state to a second intermediate neutral state by operating the third switch and the sixth switch in the conducting state and operating the first switch, the second switch, the fourth switch, and the fifth switch in the non-conducting state;
  transition the phase-leg from the second intermediate neutral state to a second state to generate the output voltage having a second level by operating the second switch, the fourth switch, and the sixth switch in the conducting state and operating the first switch, the third switch, and the fifth switch in the non-conducting state, wherein the second level comprises a negative voltage level; and
  transition the phase-leg from the second state to the neutral state.

19. The modulator of claim 18, wherein the controller is configured to:
  transition the second switch and the fifth switch to the non-conducting state to transition the phase-leg from the neutral state to the second intermediate neutral state; and
  transition the second switch and the fourth switch to the conducting state and transition the third switch to the non-conducting state to transition the phase-leg from the second intermediate neutral state to the second state.

20. A three-level active neutral point clamped converter, comprising:
  one or more phase-legs, wherein at least one phase-leg of the one or more phase-legs comprises:
    an output terminal;
    a plurality of input terminals comprising a first input terminal, a second input terminal, and a neutral input terminal;
    a plurality of switches disposed between the plurality of input terminals and the output terminal, wherein the plurality of switches comprises a first switch, a second switch, a third switch, a fourth switch, a fifth switch, and a sixth switch, wherein the first switch, the second switch, the third switch, and the fourth switch of the plurality of switches are operatively coupled in series, and wherein the first switch is operatively coupled to the first input terminal, the fourth switch is operatively coupled to the second input terminal, an interconnection point of the second switch and the third switch is operatively coupled to the neutral input terminal, the fifth switch is operatively coupled between an interconnection point of the first switch and the second switch and the output terminal, and the sixth switch is operatively coupled between an interconnection point of the third switch and the fourth switch and the output terminal;
  a modulator operatively coupled to the plurality of switches of the one or more phase-legs and configured to:
    operate the at least one phase-leg of the one or more phase-legs in a neutral state to generate an output voltage having a neutral level by operating the second switch, the third switch, the fifth switch, and the sixth switch of the plurality of switches in a conducting state and operating the first switch and the fourth switch of the plurality of switches in a non-conducting state;
    transition the at least one phase-leg of the one or more phase-legs to a first intermediate neutral state from the neutral state by operating the second switch and the fifth switch in the conducting state and operating the first switch, the third switch, the fourth switch, and the sixth switch in the non-conducting state; and
    transition the at least one phase-leg of the one or more phase-legs from the first intermediate neutral state to a first state to generate the output voltage having a first level by operating the first switch, the third switch, and the fifth switch in the conducting state and operating the second switch, the fourth switch, and the sixth switch in the non-conducting state.

* * * * *